United States Patent
Kahlert et al.

(10) Patent No.: US 7,476,319 B2
(45) Date of Patent: Jan. 13, 2009

(54) METHOD AND APPARATUS FOR CONTINUOUSLY CONTROLLING DENITRIFICATION IN VARIABLE NITROGEN LOADS IN WASTEWATER

(75) Inventors: Jürgen Kahlert, Siegburg (DE); Frank Niemeyer, Wuppertal (DE); Matthäus Schmidt, Leichlingen (DE)

(73) Assignee: Bayer Healthcare AG, Leverkusen (DE)

( * ) Notice: Subject to any disclaimer, the term of this patent is extended or adjusted under 35 U.S.C. 154(b) by 0 days.

(21) Appl. No.: 11/570,651

(22) PCT Filed: Jun. 16, 2005

(86) PCT No.: PCT/EP2005/006464

§ 371 (c)(1),
(2), (4) Date: Jul. 13, 2007

(87) PCT Pub. No.: WO2005/123611

PCT Pub. Date: Dec. 29, 2005

(65) Prior Publication Data

US 2008/0017583 A1     Jan. 24, 2008

(30) Foreign Application Priority Data

Jun. 18, 2004   (DE) .................. 10 2004 029 539

(51) Int. Cl.
*C02F 3/00* (2006.01)
(52) U.S. Cl. .............. 210/605; 210/760; 210/739; 210/743; 210/623; 210/627; 210/197; 210/220
(58) Field of Classification Search .............. 210/760, 210/739, 743, 605, 623, 627, 197, 220
See application file for complete search history.

(56) References Cited

U.S. PATENT DOCUMENTS

| | | | |
|---|---|---|---|
| 4,370,235 A | 1/1983 | Suzuki et al. | |
| 6,015,496 A | 1/2000 | Khudenko | |
| 6,337,020 B1 | 1/2002 | Thieblin et al. | |
| 6,589,432 B2 * | 7/2003 | Taira | 210/760 |

FOREIGN PATENT DOCUMENTS

| | | |
|---|---|---|
| DE | 3605962 | 8/1987 |
| DE | 4119144 | 12/1992 |
| DE | 19942184 | 3/2001 |
| DE | 10215413 | 10/2003 |
| EP | 0 645 347 B1 | 3/1995 |
| EP | 1254865 | 11/2002 |
| JP | 2001232390 A * | 8/2001 |

* cited by examiner

*Primary Examiner*—Chester T Barry
(74) *Attorney, Agent, or Firm*—Norris McLaughlin & Marcus

(57) ABSTRACT

The invention is a method and an apparatus for continuously controlling denitrification in wastewater purification in a sewage treatment plant having at least one denitrification stage under varying nitrogen loads comprising the steps a) provision of excess sludge, b) treatment of the excess sludge according to running parameters determined in advance, c) separation of the treated excess sludge into an organic fraction and an inorganic fraction, d) measurement of actual values for dissolved organic carbon (DOC) in the organic fraction, e) recirculation of the organic fraction to one of the denitrification stages, f) comparison of actual values with predetermined setpoint values for DOC fractions and, in the event of difference between actual values and setpoint values, determination of altered running parameters for treatment of the excess sludge in step b), g) repetition of steps a), to f).

16 Claims, 16 Drawing Sheets

METHOD AND APPARATUS FOR CONTINUOUSLY CONTROLLING DENITRIFICATION IN VARIABLE NITROGEN LOADS IN WASTEWATER

This is a 371 of PCT/EP2005/06464 filed 16 Jun. 2005 (international filing date).

The invention relates to denitrification under varying nitrogen loads in wastewater. Denitrification is the conversion of nitrate compounds to pure nitrogen. This process is effected in the absence of air (anaerobically) by bacteria under the condition that sufficient carbon compounds are present so that the nitrogen can be replaced by carbon and $CO_2$ can be produced. The conversion proceeds in two stages, first from nitrate to nitrite, and then from nitrite to $N_2$.

BACKGROUND OF THE INVENTION

Wastewater treatment plants are designed in such a manner that the denitrification, depending on the expected wastewater composition, takes place in a first or later biological clarification stage which is here termed denitrification stage. If the wastewater itself has high nitrate loads and few other nitrogen compounds, the denitrification can customarily take place in the first stage of the clarification process. Frequently, the wastewater contains the nitrogen load in the form of nitrogen compounds such as ammonium, urea or organic nitrogen compounds. In this case, in a first biological clarification stage, the nitrification takes place, that is conversion of these nitrogen compounds to nitrate compounds. This takes place in air (aerobically) using corresponding bacteria in two stages via nitrite to nitrate. Denitrification proceeds in this case in a second biological clarification stage.

Customary denitrification stages are made up in such a manner that the liquid phase is removed from the denitrification stage, if appropriate after passage through a secondary clarification tank/settling tank, as clarified wastewater and a part of the sludge, that is the solid phase, is recirculated to the denitrification stage. The remaining sludge forms what is termed excess sludge. This excess sludge is either disposed of completely or subjected to further treatment and subsequently recirculated in whole or in part to the denitrification stage.

The bacteria in the denitrification stage require, for optimum denitrification performance, defined amounts of carbon, but also nitrogen and phosphorus. The required amounts of these elements varies with the wastewater composition, in particular with the nitrogen load. Frequently, the amount of C, N and P required for optimum denitrification is added directly from storage vessels. The required amounts of C, N and P are matched to the respective nitrogen load for optimum denitrification. However, it is also known to recover C, N and P from the organic fraction of the excess sludge.

EP 1 254 865 A1 discloses mechanically disintegrating excess sludge and subsequently treating it with ozone and recirculating the liquid phase of the treated excess sludge to the denitrification stage. In the ozone treatment stage, ozone is added in an amount of 100 to 150 g/kg of dry matter.

U.S. Pat. No. 6,337,020 B1 discloses the treatment of excess sludge from a biological treatment stage by mechanical disintegration and addition of ozone. The treated excess sludge is completely recirculated to the biological treatment stage. In the ozone treatment stage, ozone is added in an amount of 1 to 20 g/kg of dry matter and the pH is 6 to 9.

SUMMARY OF THE INVENTION

EP 0 645 347 B1 discloses the treatment of excess sludge from an aerobic biological treatment stage by mechanical disintegration and ozone addition and recycling the treated excess sludge to the biological treatment stage. In the ozone treatment stage, ozone is added in an amount of 2 to 50 g/kg of dry matter and the pH is at most 5.

U.S. Pat. No. 4,370,235 discloses mechanically disintegrating excess sludge from a biological treatment stage and subsequently treating it with ozone and recirculating the liquid phase of the treated excess sludge to the biological treatment stage. In the ozone treatment stage, ozone is added in an amount of 4.4 g/liter and the pH is 7.2.

The known methods for treating excess sludge serve solely for reducing the excess sludge. They are not optimized with respect to efficiency and expenditure of the denitrification. Provision of an excess sludge which is optimized in its composition, in particular in the contents of C, N and P, for the denitrification stage is not discussed. In the case of varying nitrogen loads, the running parameters must be adapted for optimum, that is as complete as possible, denitrification of the nitrogen load of the wastewater, since certain running parameters are suitable for high nitrogen loads, others for low nitrogen loads. Ozone addition in too great an amount, as can easily occur without adaptation at low nitrogen loads, can, for example, lead to the fact that the cells in the excess sludge are not only broken open but the cell contents are oxidized, and the recirculated excess sludge thus contains too little C, N and P in order to ensure optimum further processing in the denitrification stage. The known methods also do not take into account the fact that mechanical disintegration, just as the production of ozone, is highly energy-consuming and this consumption should be adapted to the effect achieved, the effect achieved in turn being dependent on the respective wastewater composition.

The object of the invention is therefore to optimize the known methods for treating excess sludge in such a manner that with the lowest possible use of resources the best possible result in the denitrification stage is achieved and the excess sludge is minimized as greatly as possible.

The solution of the object of the invention is a method for continuously controlling denitrification in wastewater purification in a sewage treatment plant having at least one denitrification stage under varying nitrogen loads comprising the steps a) provision of excess sludge,
b) treatment of the excess sludge according to running parameters determined in advance,
c) separation of the treated excess sludge into an organic fraction and an inorganic fraction,
d) measurement of actual values for dissolved organic carbon (DOC) in the organic fraction,
e) recirculation of the organic fraction to one of the denitrification stages,
f) comparison of actual values with predetermined setpoint values for DOC fractions and, in the event of difference between actual values and setpoint values, determination of altered running parameters for treatment of the excess sludge in step b),
g) repetition of steps a). to f).

The excess sludge can originate from one of the denitrification stages, but also from another part of the sewage treatment plant.

DETAILED DESCRIPTION

DOC (dissolved organic carbon) in the organic fraction of the treated excess sludge which is recirculated to one of the denitrification stages serves as control parameter for the running parameters in the treatment of the excess sludge. At the optimum (setpoint) DOC value, the organic fraction of the excess sludge which is recirculated to the denitrification stage contains the optimum amounts of carbon compounds, N and P for the denitrification, these optimum amounts being dependent on the nitrogen load. A defined optimum DOC value can be assigned to each nitrogen load.

The running parameters which can be varied during treatment of the excess sludge when the actual value of DOC differs from the setpoint value are the pH of the excess sludge, the switching on or switching off of mechanical disintegration and the switching on or switching off of ozone addition and the amount of ozone added.

The pH is preferably set in a range between 7 and 13. The amount of ozone added is preferably no greater than 100 g/kg of dry matter.

To each DOC value, at least one optimum combination of the three abovementioned running parameters can be assigned. When there is a plurality of optimum combinations, preferably that which means the lowest expenditure or resources is selected. This generally means that the running parameter combinations to be preferred are those in which as far as possible no mechanical disintegration takes place and no or only small amounts of ozone are added.

The solution of the problem of the invention is furthermore an apparatus for continuously controlling denitrification in wastewater purification in a sewage treatment plant having at least one denitrification stage under varying nitrogen loads comprising at least one denitrification stage,
means for providing excess sludge,
a treatment stage for treating the excess sludge according to running parameters determined in advance,
means for separating the treated excess sludge into an organic fraction and an inorganic fraction,
means for recirculating the organic fraction of the treated excess sludge to one of the denitrification stages,
means for measuring dissolved organic carbon (DOC) in the organic fraction of the treated excess sludge,
means for comparing measured actual values for DOC with predetermined setpoint values for DOC,
means for determining altered running parameters for treating the excess sludge if a difference is found between actual values and setpoint values for DOC.

The means for providing excess sludge from the denitrification stage or from another part of the sewage treatment plant customarily comprises a secondary clarification tank in which, after the sedimentation method, the sludge sinks under the effect of gravity. The excess sludge is taken off at the bottom of the secondary clarification tank.

The treatment stage for the excess sludge can comprise a vessel having a feed device for pH-influencing means, a mechanical disintegrator and/or an ozonizer having injectors for introducing the ozone into the excess sludge to be treated. The ozone is customarily added at superatmospheric pressure. Mechanical disintegrators which can serve are, for example, a shear-gap homogenizer, a high-pressure homogenizer, an ultrasonic homogenizer or a stirred ball mill, as disclosed by J. Kopp et al., Anearober Abbau mechanisch aufgeschlossener Klärschlämme [Anaerobic degradation of mechanically disintegrated sewage sludges], 12th. ZAF Seminar, Brunswick 18-19.9.1997, DFG-Forschergruppe zu Biologische Prozesse mit dispersen Feststoffen [DFG researcher group on biological processes with disperse solids], chapter 3: sewage sludge digestion.

The means for separating the treated excess sludge into an organic fraction and an inorganic fraction can be a secondary clarification tank or a filter unit for filtering off the inorganic fraction.

The means for recirculating the organic fraction of the treated excess sludge into one of the denitrification stages are customarily the corresponding lines which if appropriate are equipped with pumps.

The means for measuring dissolved organic carbon (DOC) in the organic fraction of the treated excess sludge can be a continuous-flow process analytical instrument for online measurement. However, individual samples can also be taken and analyzed in the laboratory by conventional methods.

The means for comparison of measured actual values for DOC with predetermined setpoint values for DOC is usually an electronic data processing unit. The means for determining altered running parameters can be an electronic data processing unit combined with a database.

The advantage of the method of the invention and of the apparatus of the invention is that even under varying nitrogen loads, the denitrification process runs continuously at the optimum, or close to the optimum, so that a denitrification as complete as possible takes place with simultaneous conservation of resources. If the denitrification process runs at the optimum, at the same time the excess sludge is minimized.

BRIEF DESCRIPTION OF THE DRAWINGS

The figures show the following

FIG. 1 shows diagrammatically the structure of the wastewater treatment plant in Wuppertal 10 in which the method of the invention is used. The works wastewater 11 of the Bayer works in Wuppertal is fed to a first biological clarification stage 12 in which nitrification of the nitrogen compounds such as ammonium, urea or organic nitrogen compounds takes place. Via an intermediate clarifier 13, the wastewater then passes into the second biological clarification stage, the denitrification stage 14. In a secondary clarifier 15 connected downstream of the denitrification stage 14, the clear phase 16 and the sludge 21 are separated. The clear phase 16 is removed as purified wastewater. About 90% of the sludge 21 from the secondary clarifier 15 is recirculated to the denitrification stage 14. About 10% of the sludge 21 is subjected to further treatment as excess sludge 17. In the treatment stage 18 a pH adjustment and/or mechanical disintegration and/or ozone addition takes place. The treated excess sludge 22 is fed to a second secondary clarifier 19 in which the clear phase 23 containing the organic fractions of the treated excess sludge 22 and the inorganic fractions 24 of the treated excess sludge 22 are separated. The inorganic fractions 24 of the treated excess sludge 22 are removed for further disposal. The clear phase 23 is recirculated via the intermediate clarifier 13 to the denitrification stage 14. Measurement 25 of the actual value for the DOC proceeds in the clear phase 23.

Measurement 25 of the actual value for the DOC proceeds online using a continuous-flow process analytical instrument. The setpoint DOC is determined via the nitrogen load in the wastewater. The nitrogen load of the wastewater is measured online using a continuous-flow process analytical instrument.

The measured nitrogen load is assigned to setpoint DOC empirically and according to stoichiometric conditions.

If the measured actual value deviates from the setpoint value for DOC, an altered set of running parameters (pH, mD, ozone) is determined. The running parameters here are pH, mechanical disintegration yes/no (mD) and amount of ozone added (ozone [g/kg of dry matter]).

In experimental series on a pilot plant scale, the DOC value and the degradation rate of the excess sludge under various nitrogen loads were measured for various combinations of running parameters (pH, mD, ozone). The effect of the running parameters on the DOC value and the degradation rate of excess sludge were analyzed under different nitrogen loads via linear and multiple regression of the measured values as a function of individual running parameters or combinations of running parameters.

Figure 1:
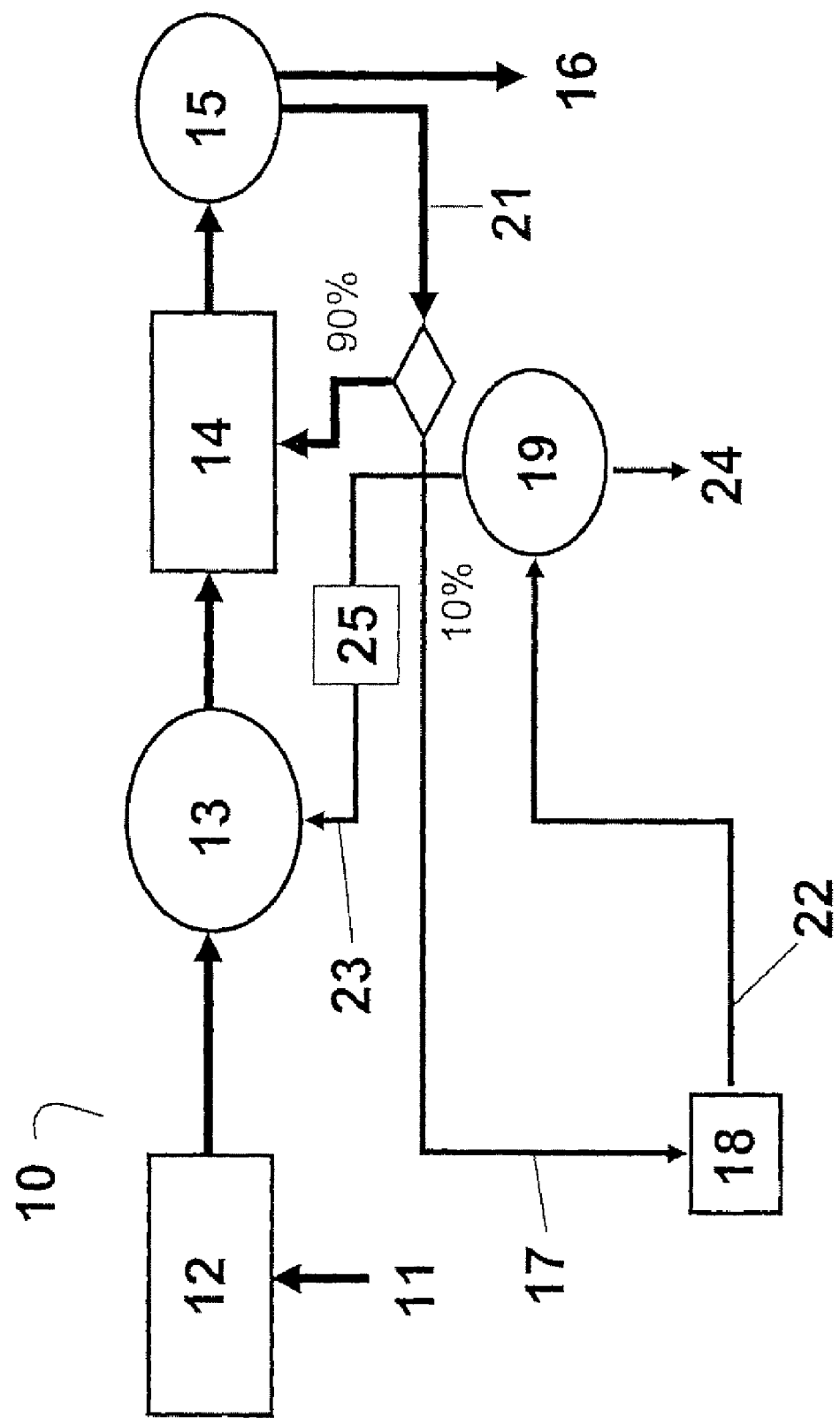
FIG. 1 diagrammatic structure of the wastewater treatment plant in Wuppertal
Figure 2:
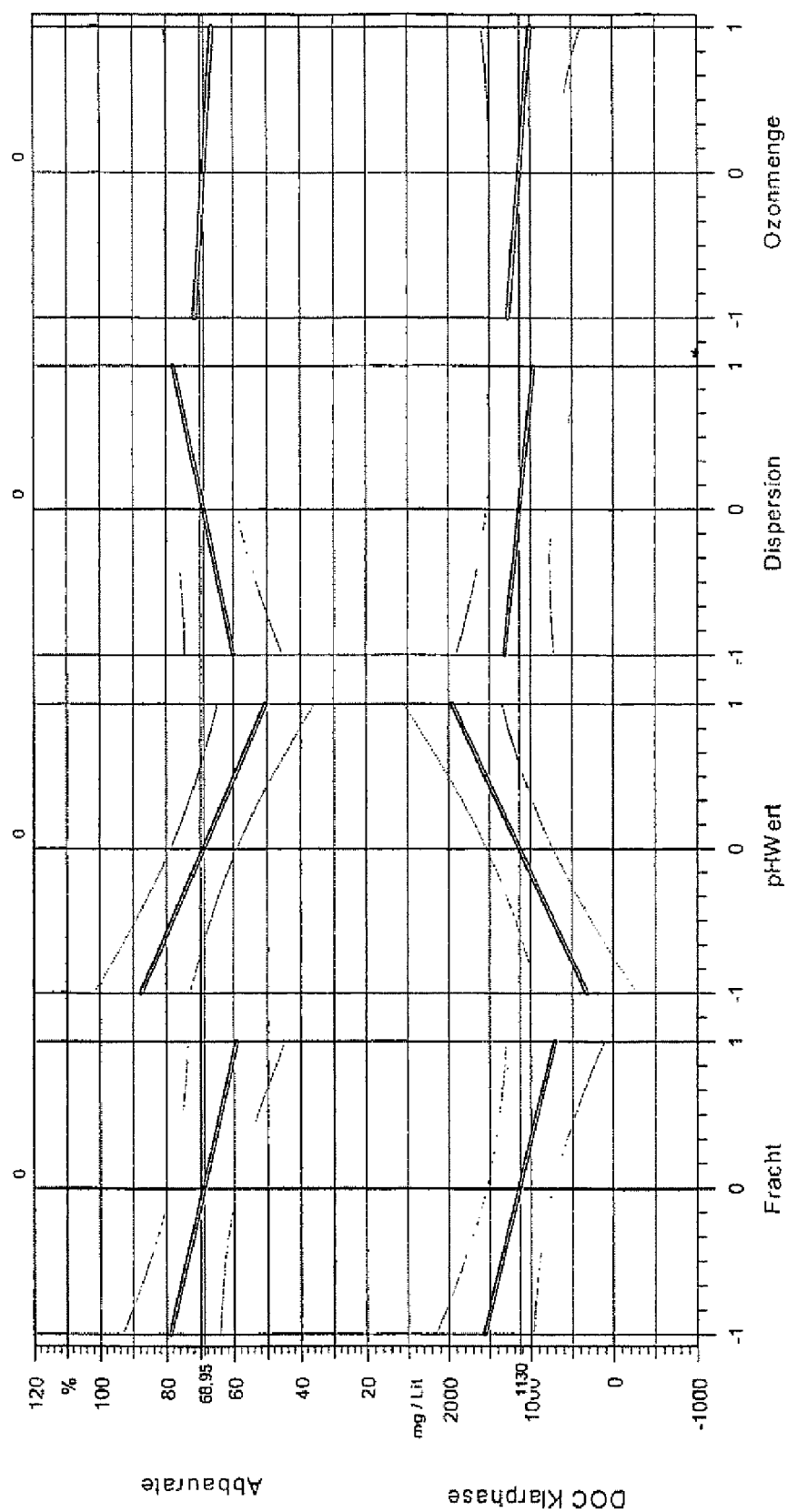
FIG. 2 effect of running parameters on DOC and excess sludge
Figure 3A:
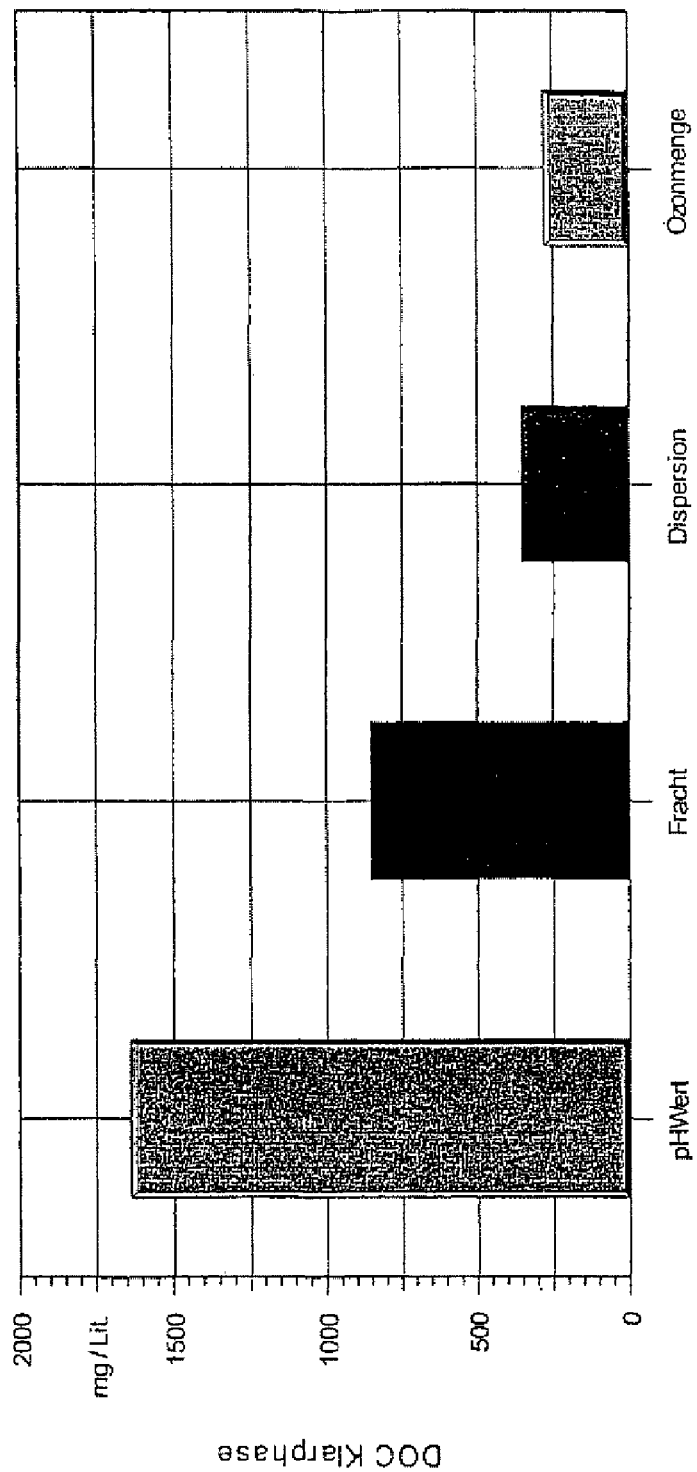
FIG. 3a, 3b effect of running parameters on DOC and excess sludge in comparison
Figure 3B:
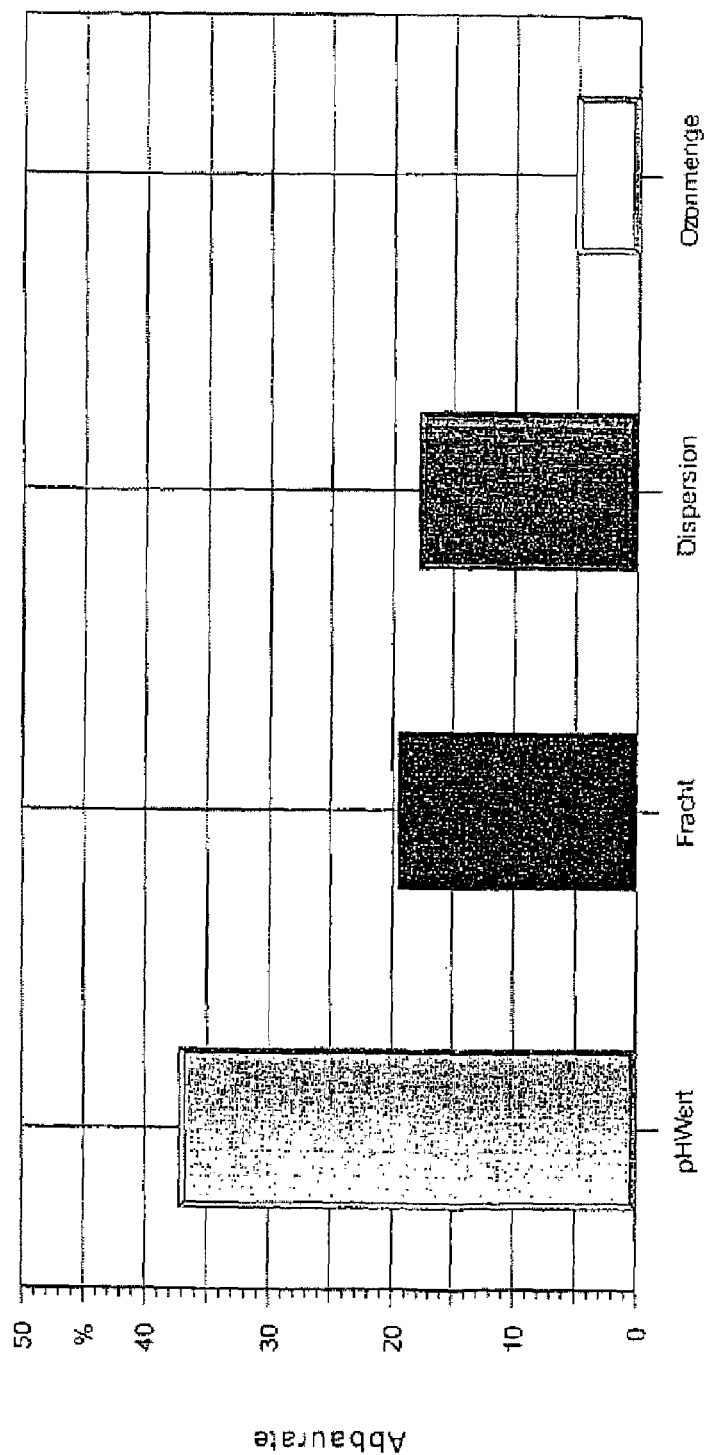

The experiments showed that the pH has the greatest effect on the DOC value and the degradation rate of excess sludge, followed by dispersion and amount of ozone (FIG. 2, FIGS. 3a, 3b).

In the figures, the tested ranges for the running parameters are normalized. The pH of −1 corresponds to 7.6 and +1 corresponds to 12.7. A dispersion of −1 means that no mechanical disintegration was used and a dispersion of +1 means that mechanical disintegration was used. An ozone amount of −1 corresponds to an ozone amount of 16 g/kg of dry matter and an ozone amount of −1 corresponds to an ozone amount of 84 g/kg of dry matter.

Figure 4:
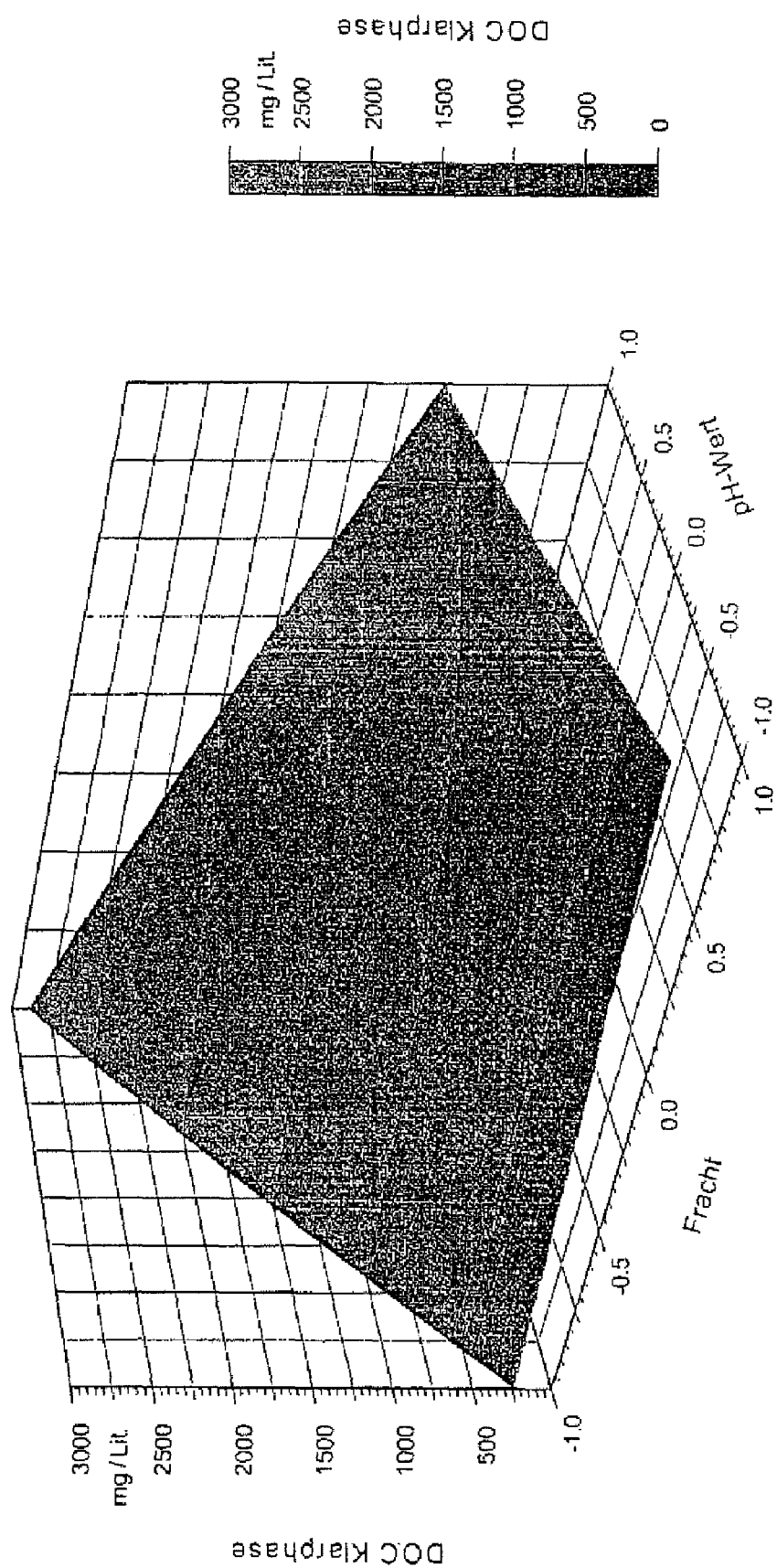
FIG. 4 dependence of DOC in the clear phase on pH under different nitrogen loads FIG. 5 dependence of DOC in the clear phase on the mechanical dispersion under different nitrogen loads FIG. 6 dependence of DOC in the clear phase on the amount of ozone under different nitrogen loads FIG. 7 dependence of DOC in the clear phase on pH and dispersion FIG. 8 dependence of DOC in the clear phase on pH and amount of ozone FIG. 9 dependence of DOC in the clear phase on dispersion and amount of ozone FIG. 10 dependence of degradation rate of excess sludge on pH under different nitrogen loads FIG. 11 dependence of degradation rate of excess sludge on mechanical dispersion under different nitrogen loads FIG. 12 dependence of the degradation rate of excess sludge on the amount of ozone under different nitrogen loads FIG. 13 dependence of the degradation rate of excess sludge on pH and dispersion FIG. 14 dependence of the degradation rate of excess sludge on pH and amount of ozone FIG. 15 dependence of the degradation rate of excess sludge on dispersion and amount of ozone.
Figure 5:
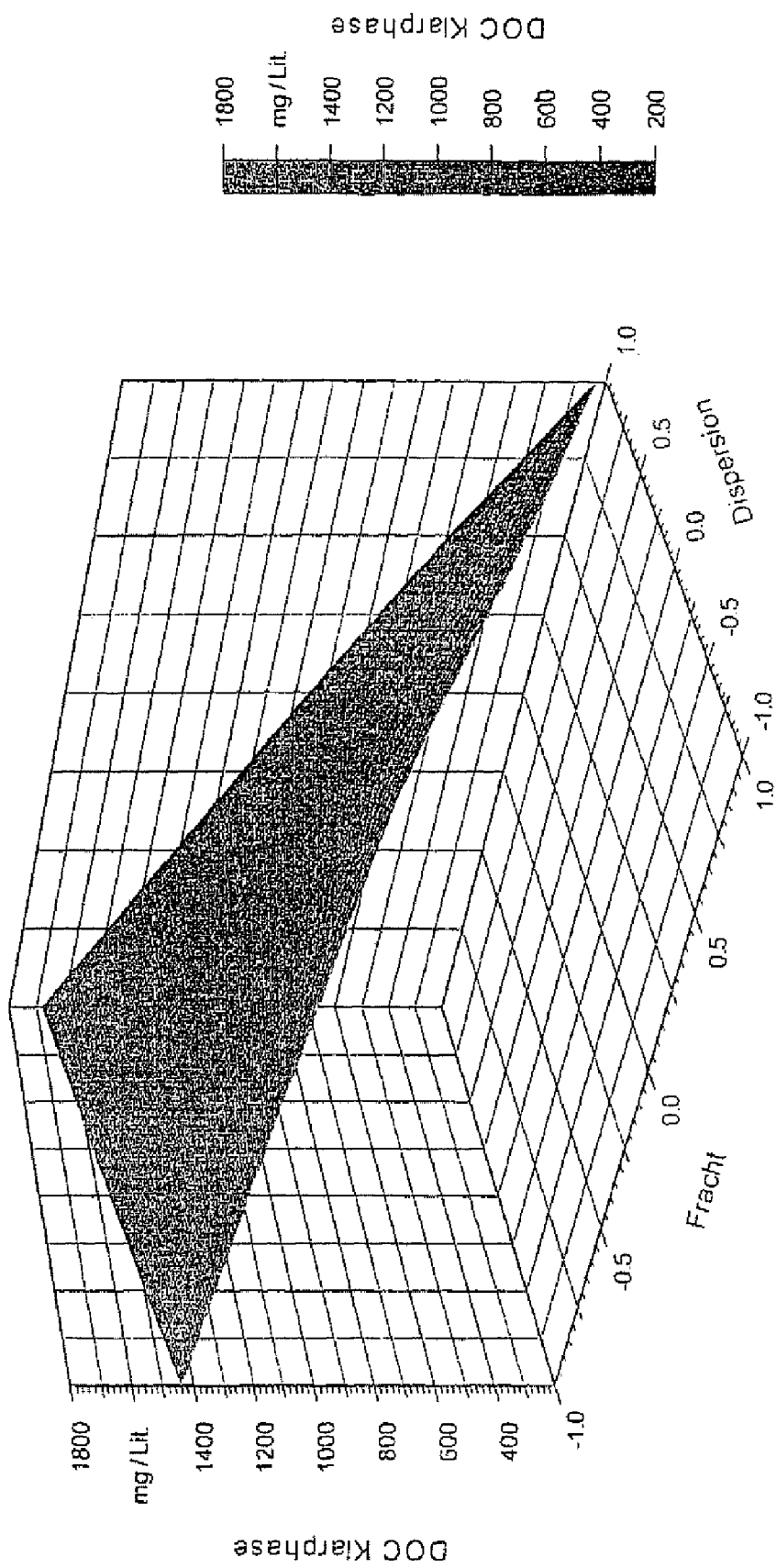
Figure 6:
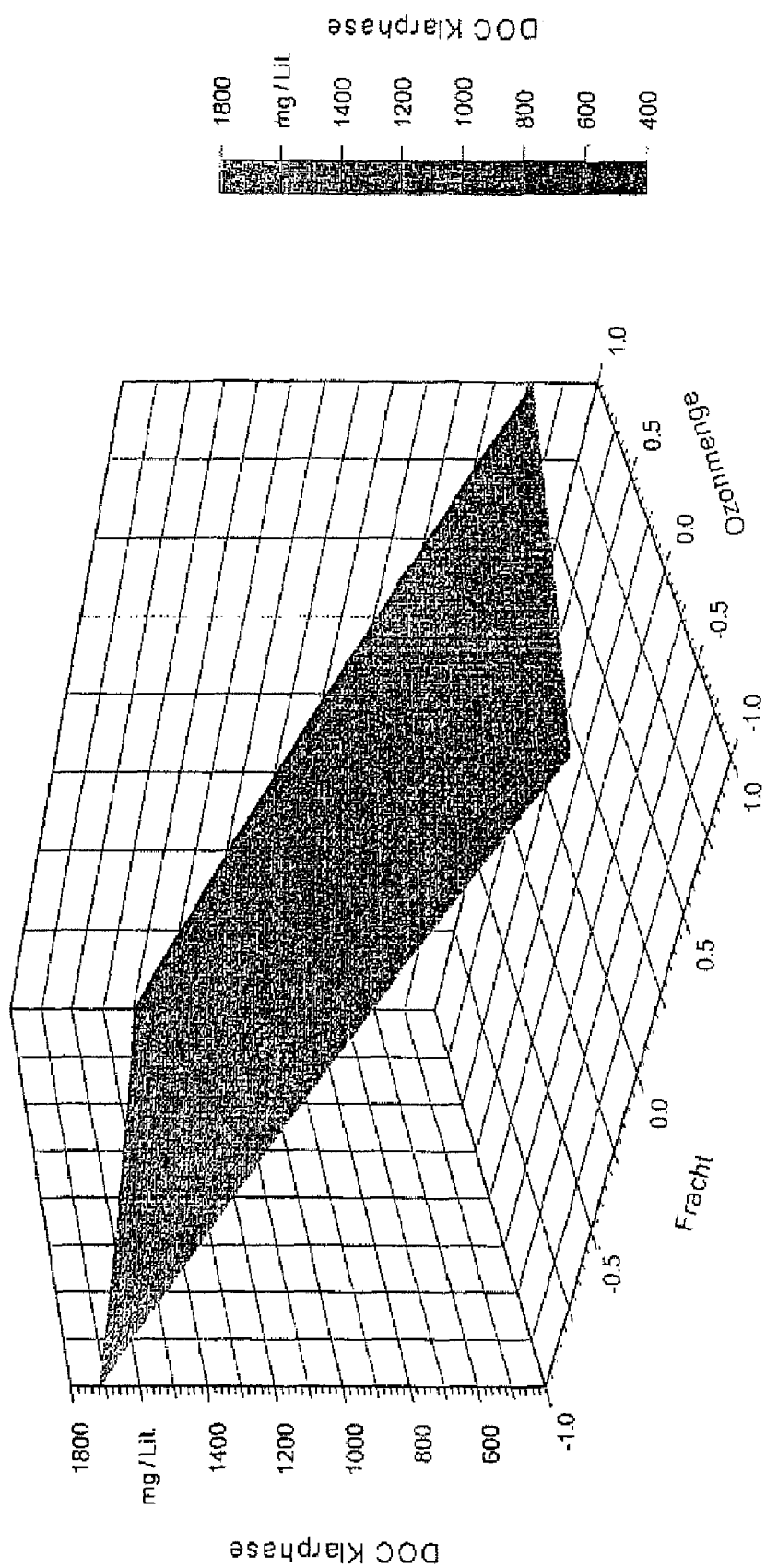

In addition, the nitrogen load was varied in the range from 6 kg/h (=−1) and 12 g/h (=+1). The degradation rate for the excess sludge is indicated in percent of dry matter and the DOC value in the clear phase in milligram per liter, In FIGS. 4 to 6, the dependence of DOC in the clear phase on pH, mechanical dispersion and amount of ozone under different nitrogen loads is shown.

Figure 7:
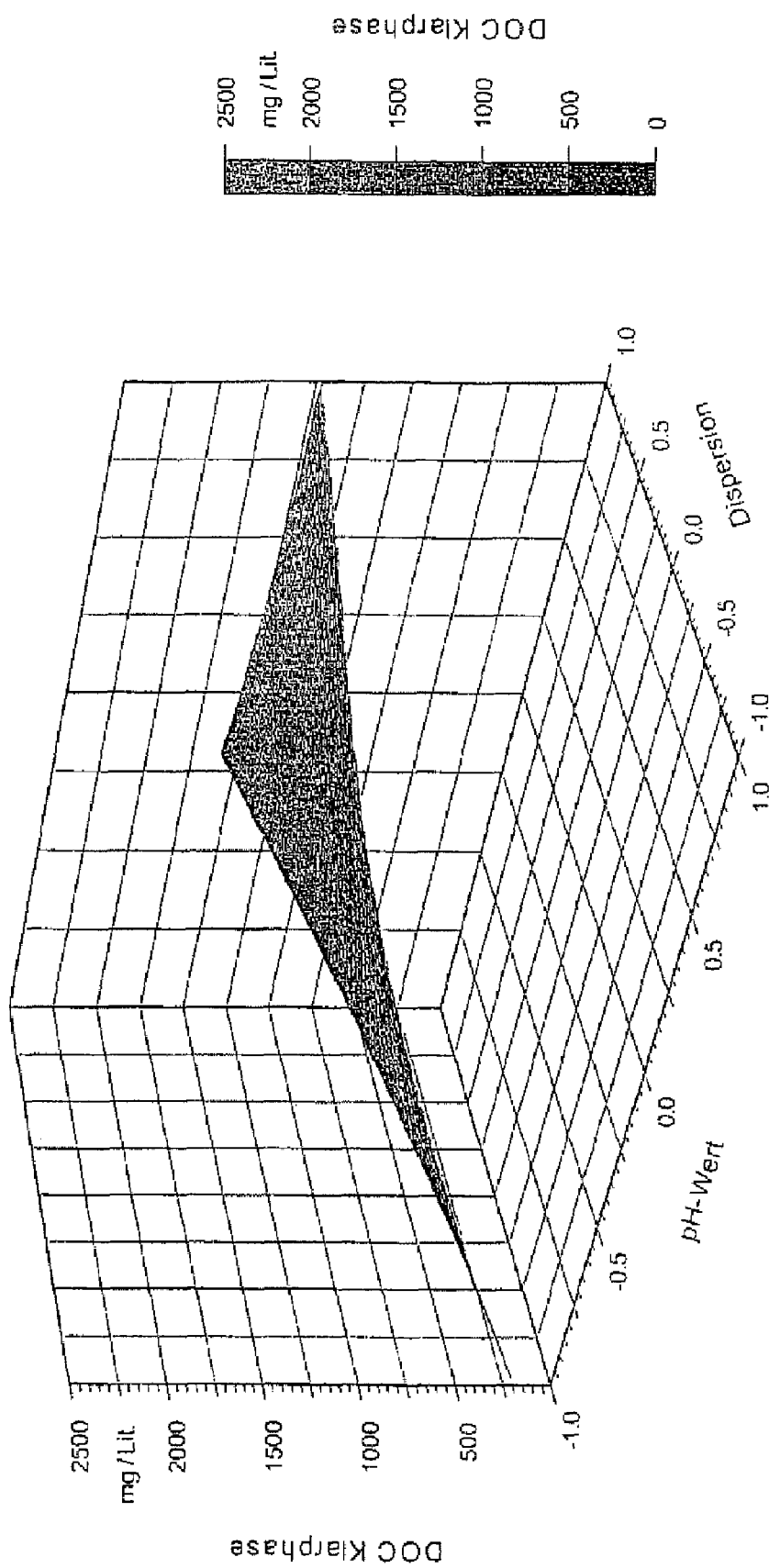
Figure 8:
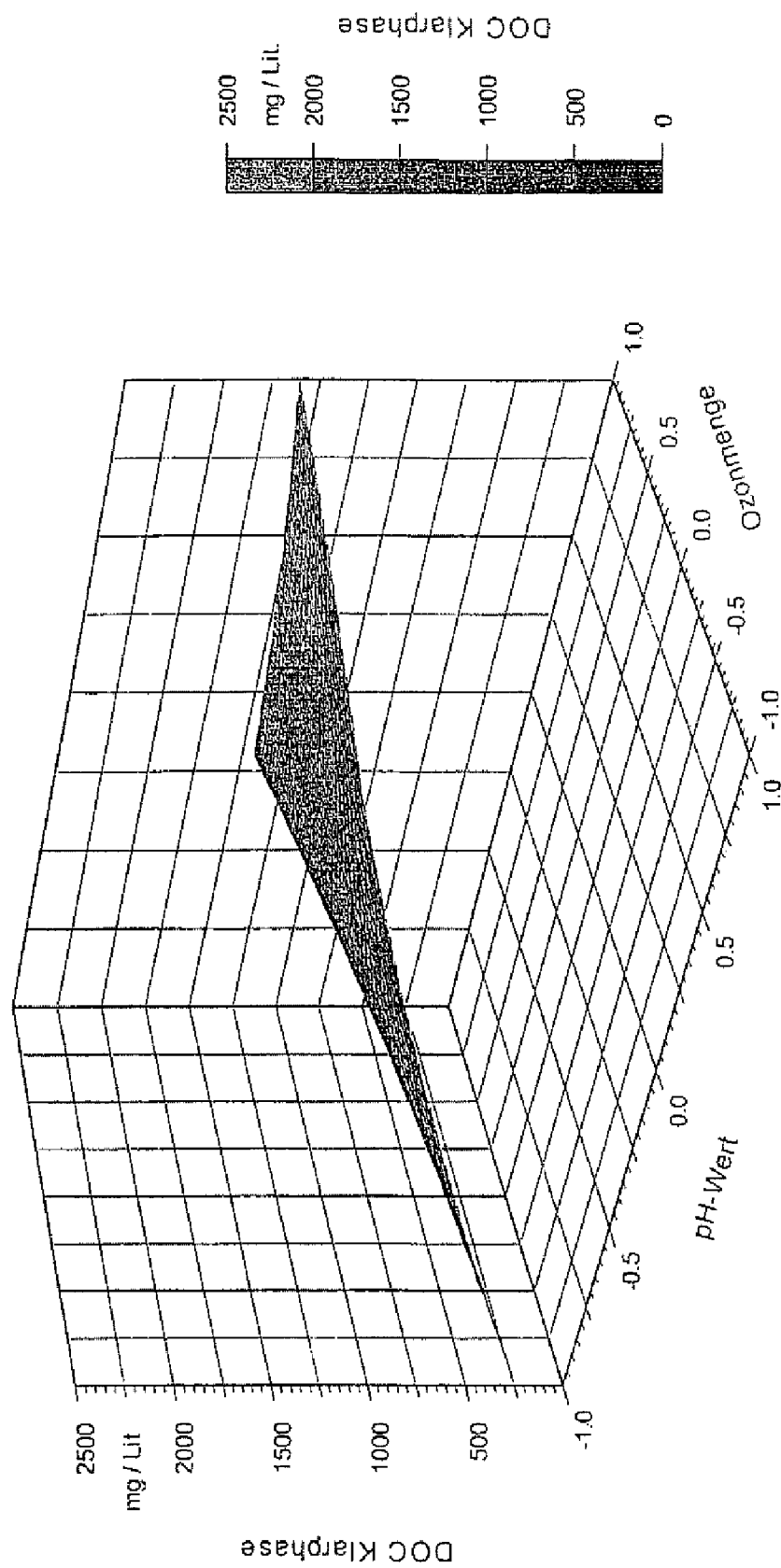
Figure 9:
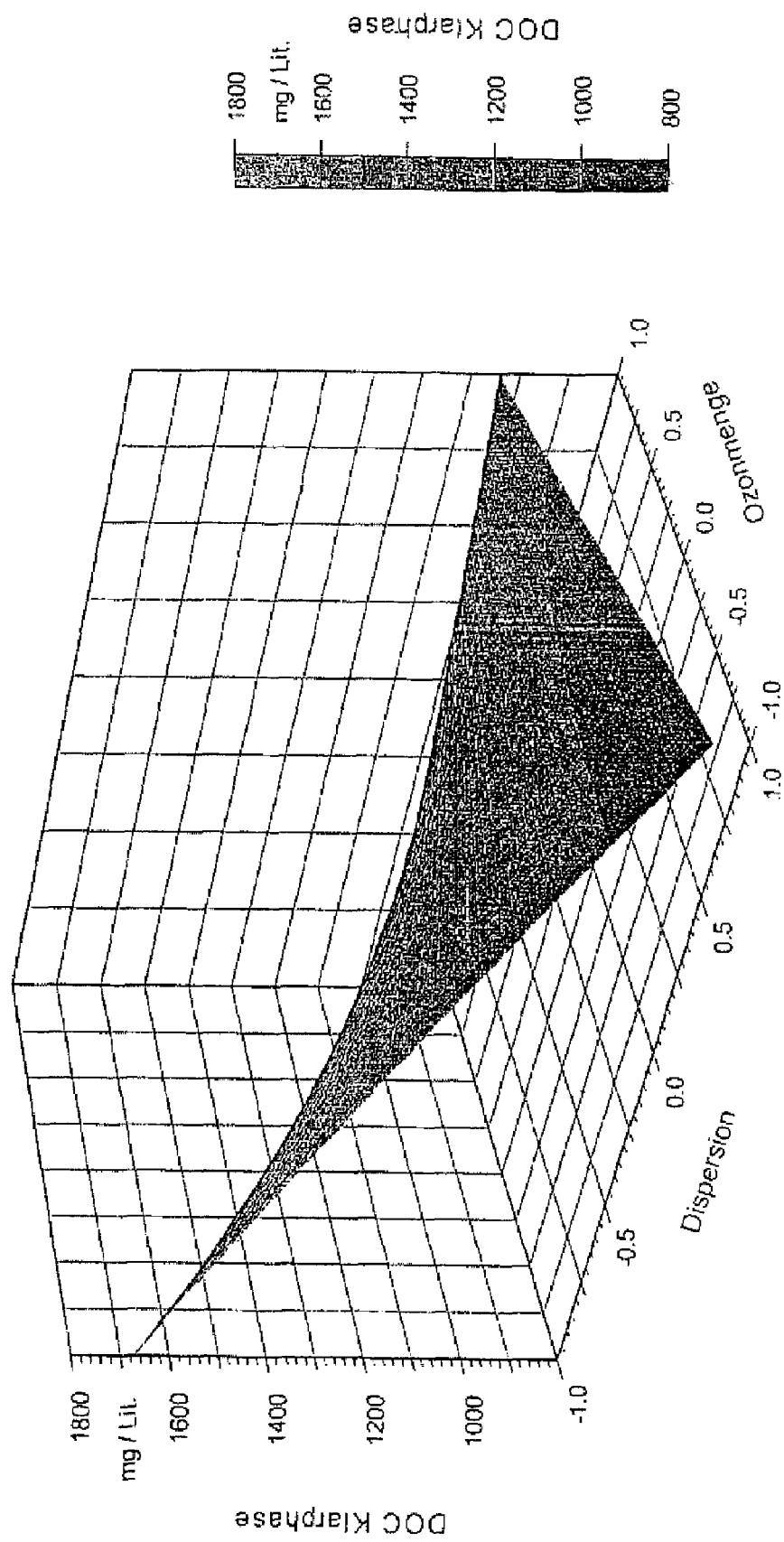

In FIGS. 7 to 9, the dependence of DOC in the clear phase on in each case two of the three running parameters (pH, mD, ozone) is shown.

Figure 10:
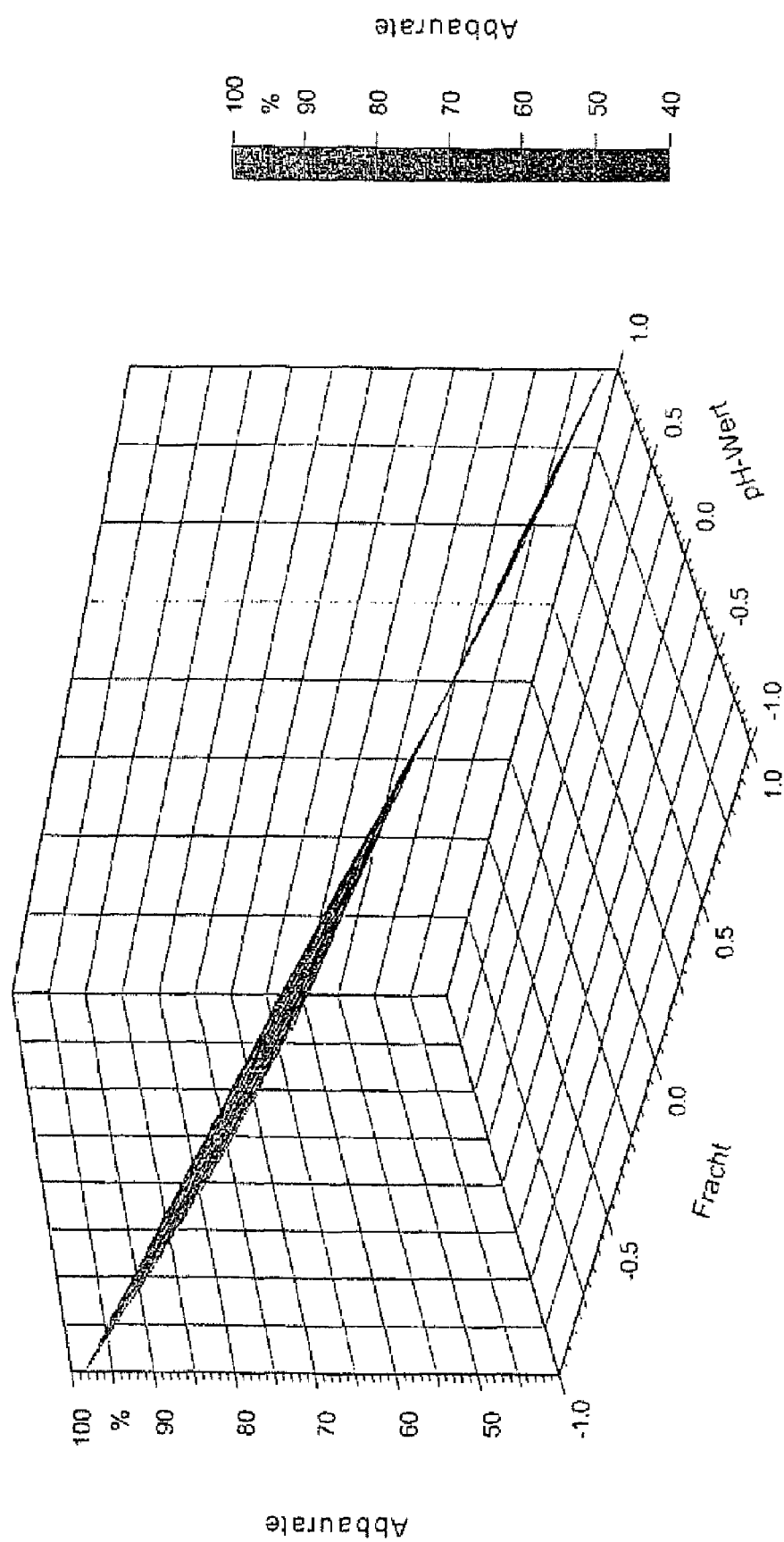
Figure 11:
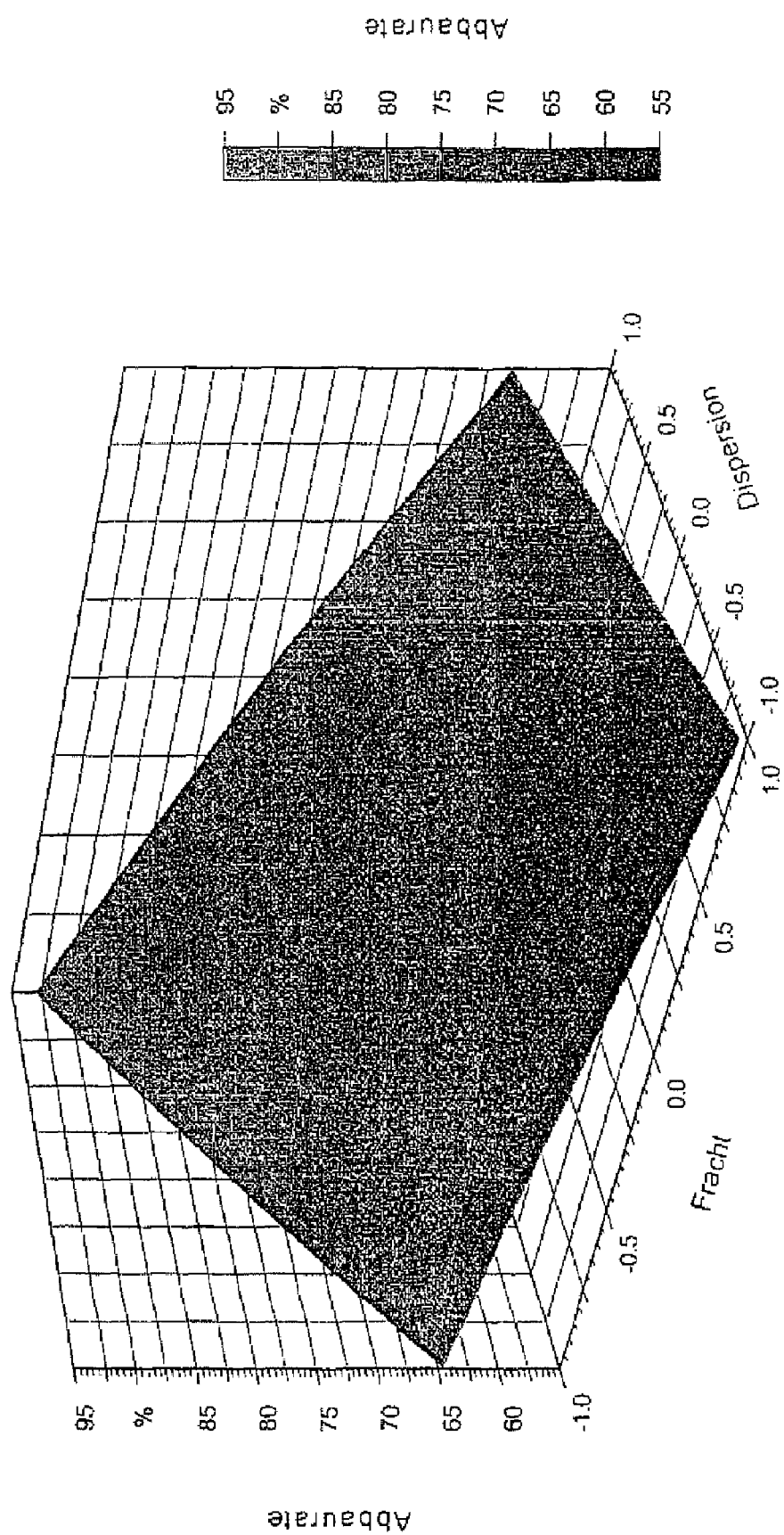
Figure 12:
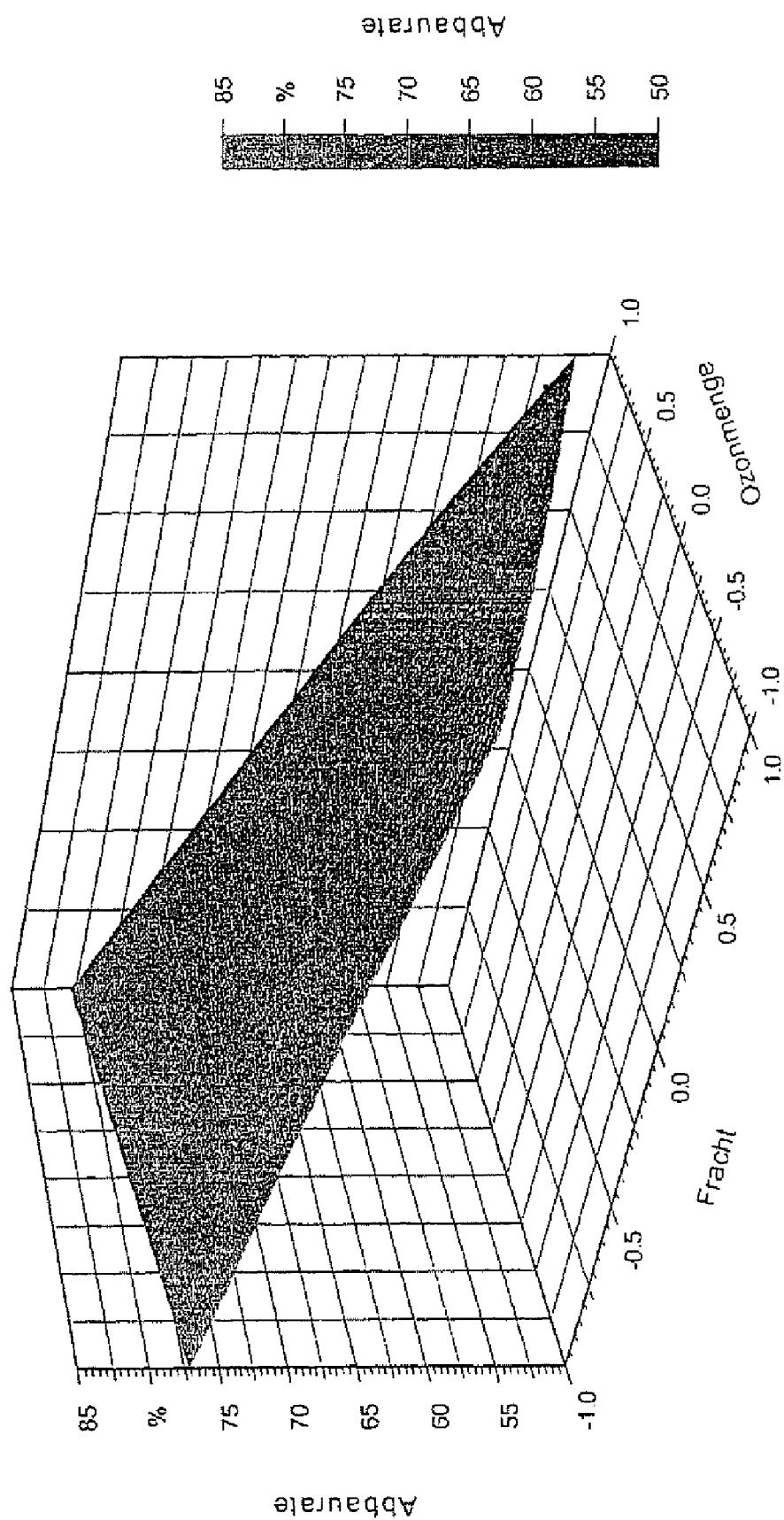

In FIGS. 10 to 12, the dependence of degradation rate of excess sludge on pH, mechanical dispersion and the amount of ozone under different nitrogen loads is shown.

Figure 13:
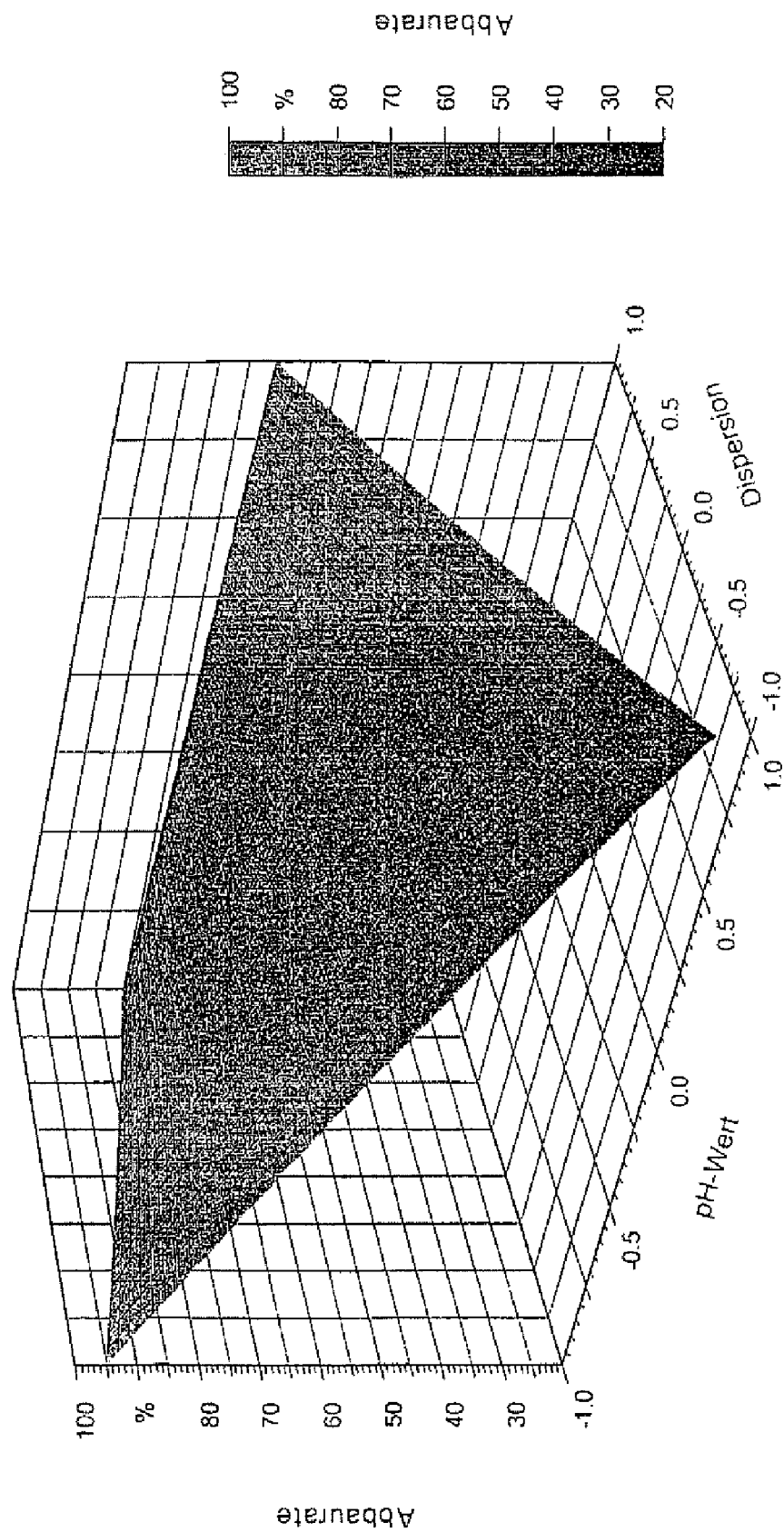
Figure 14:
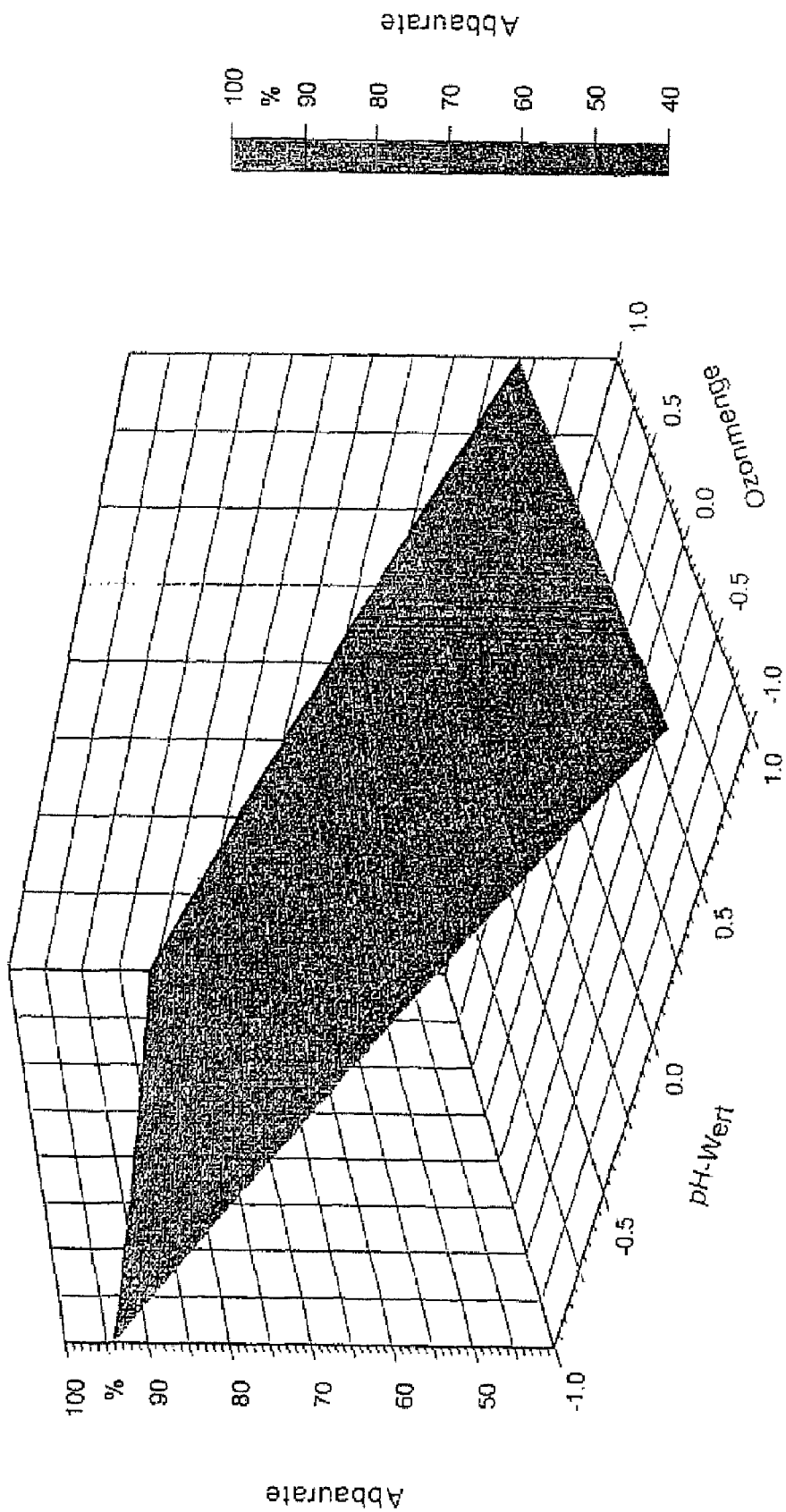
Figure 15:
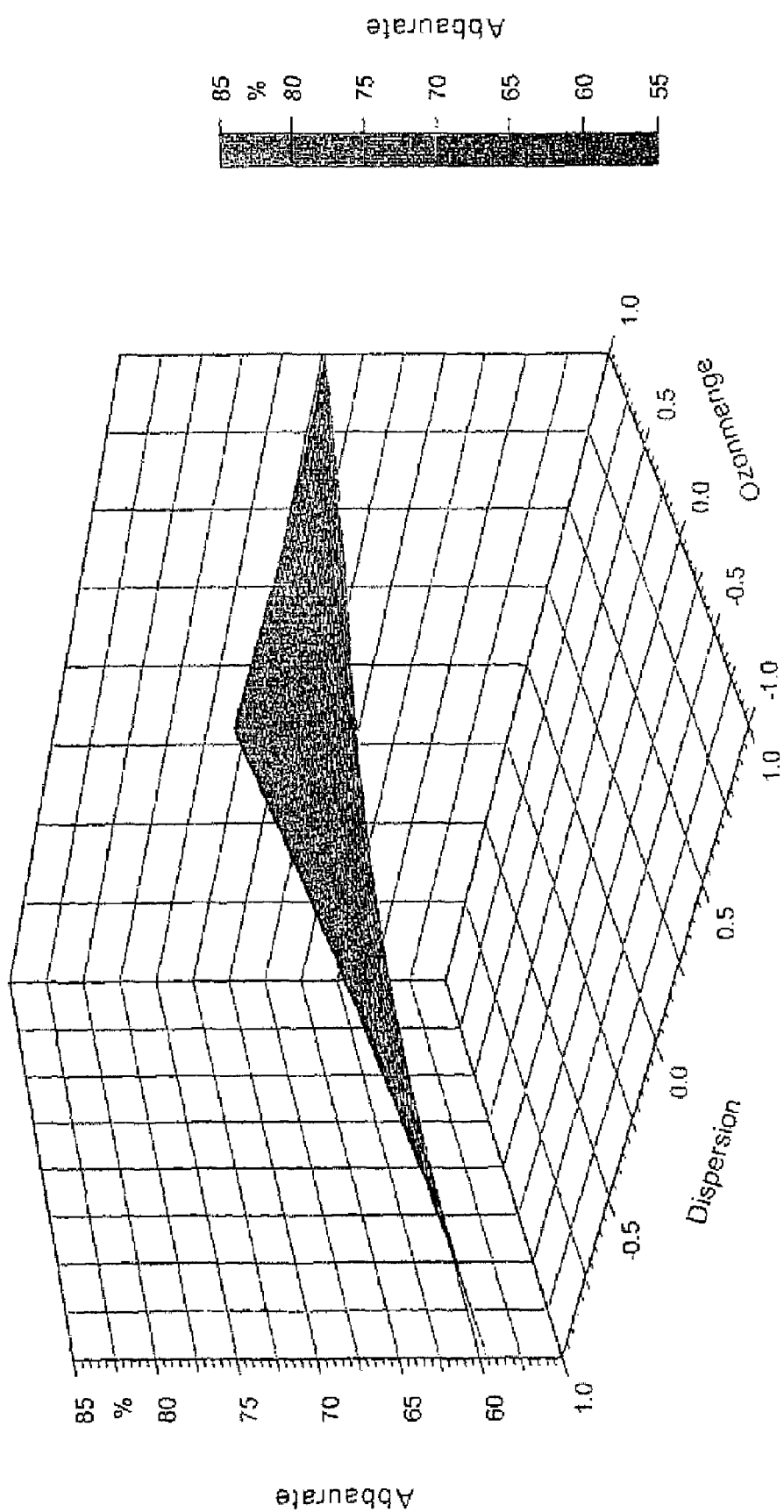

In FIGS. 13 to 15, the dependence of degradation rate of excess sludge on in each case two of the three running parameters (pH, mD, ozone) is shown.

For the altered set of running parameters, it is fundamentally of importance that first the pH is varied, since it has the greatest effect on the DOC value and low energy consumption is necessary for the change in setting. The fine adjustment then proceeds via switching on or switching off the mechanical disintegration and varying the amount of added ozone which is kept as low as possible.

The set of running parameters assigned to each setpoint value for DOC is determined reproducibly on an industrial scale by experimental series, the abovementioned criteria being taken into account and stored in a database.

In the plant according to the invention, the denitrification performance can be maximized and the excess sludge reduced by up to 90%.

The invention claimed is:

1. A method for continuously controlling denitrification in wastewater purification in a sewage treatment plant having at least one denitrification stage under varying nitrogen loads comprising the steps
  a) provision of excess sludge,
  b) treatment of the excess sludge according to running parameters determined in advance,
  c) separation of the treated excess sludge into an organic fraction and an inorganic fraction,
  d) measurement of actual values for dissolved organic carbon (DOC) in the organic fraction,
  e) recirculation of the organic fraction to one of the denitrification stages,
  f) comparison of actual values with predetermined setpoint values for DOC fractions and, in the event of difference between actual values and setpoint values, determination of altered running parameters for treatment of the excess sludge in step b),
  g) repetition of steps a). to f).

2. The method as claimed in claim 1, wherein the treatment is pH adjustment of the excess sludge.

3. The method as claimed in claim 1, wherein the treatment is addition of ozone in a running parameter range from 1 to 100 g of ozone/kg of dry matter.

4. The method as claimed in claim 1, wherein the treatment is mechanically dispersing the excess sludge.

5. The method as claimed in claim 1, wherein the treatment is a combination of pH adjustment, mechanical dispersion and subsequent addition of ozone in a running parameter range from 1 to 100 g of ozone/kg of dry matter.

6. The method as claimed in claim 3, wherein the ozone is introduced into the excess sludge by injectors and the ozone addition takes place at superatmospheric pressure.

7. The method as claimed in claim 1, wherein the excess sludge to be treated originates from one of the denitrification stages.

8. An apparatus for continuously controlling denitrification in wastewater purification in a sewage treatment plant having at least one denitrification stage under varying nitrogen loads comprising
  at least one denitrification stage,
  means for providing excess sludge,
  a treatment stage for treating the excess sludge according to running parameters determined in advance,
  means for separating the treated excess sludge into an organic fraction and an inorganic fraction,
  means for recirculating the organic fraction of the treated excess sludge to one of the denitrification stages, means for measuring dissolved organic carbon (DOC) in the organic fraction of the treated excess sludge, means for comparing measured actual values for DOC with predetermined setpoint values for DOC, means for determining altered running parameters for treating the excess sludge if a difference is found between actual values and setpoint values for DOC.

9. The apparatus as claimed in claim 8, thewherein treatment stage for treating the excess sludge according to running parameters determined in advance contains a means for pH adjustment of the excess sludge.

10. The apparatus as claimed in claim 8, wherein the treatment stage for treating the excess sludge according to running parameters determined in advance contains a means for adding ozone in a running parameter range from 1 to 100 g of ozone/kg of dry matter.

11. The apparatus as claimed in claim 8, characterized in that the treatment stage for treating the excess sludge according to running parameters determined in advance contains a means for mechanical dispersion of the excess sludge.

12. The apparatus as claimed in claim 10, wherein the means for ozone addition has injectors and the ozone addition takes place at superatmospheric pressure.

13. The method of claim 2, wherein the pH is adjusted to a running parameter range of between 7 and 13.

14. The method of claim 5, wherein the pH is adjusted to a running parameter range of between 7 and 13.

15. The method of claim 5, wherein the ozone is introduced into the excess sludge by injectors and the ozone addition takes place at superatmospheric pressure.

16. The apparatus of claim 9, wherein said pH adjustment is an adjustment to a running parameter range of between 7 and 13.

\* \* \* \* \*